March 3, 1959     O. P. HARWOOD     2,875,976
DIAPHRAGM VALVE
Filed Jan. 7, 1955
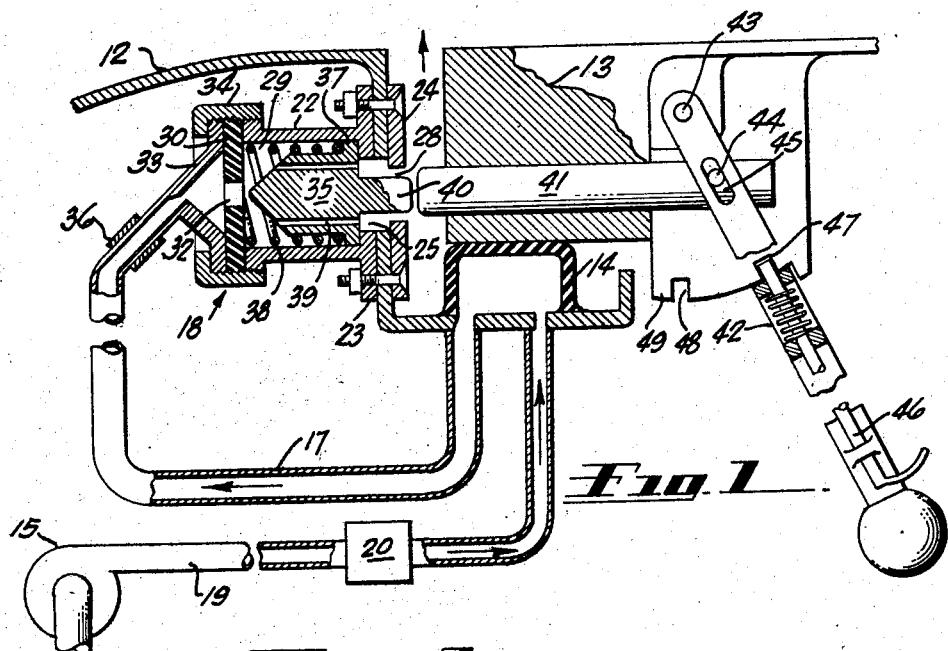
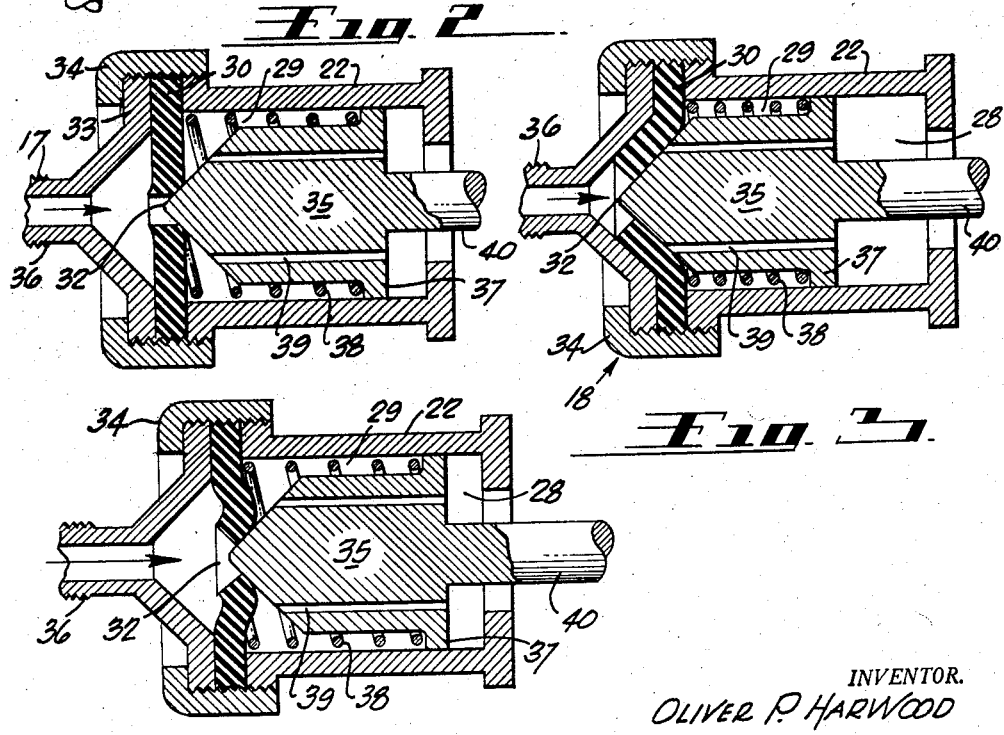
INVENTOR.
OLIVER P. HARWOOD
BY
Edwin Coates
ATTORNEY.

United States Patent Office 2,875,976
Patented Mar. 3, 1959

2,875,976

DIAPHRAGM VALVE

Oliver P. Harwood, Los Angeles, Calif., assignor to Douglas Aircraft Company, Inc., Santa Monica, Calif.

Application January 7, 1955, Serial No. 480,441

6 Claims. (Cl. 251—321)

This invention relates to valves and more particularly to a positive release valve.

In aircraft having compartments which are pressurized in excess of the surrounding atmospheric pressure, it is necessary to provide sealing means around doors, sliding hatches, that is, canopies, or the like which are in communication with those compartments so that internal pressures may be built up. Also, since the doors or hatches etc. must be capable of opening, it is customary to provide an inflatable seal between the hatch and the surrounding structure. With the seal inflated, air is prevented from escaping around the hatch, and when deflated the seal retracts into the structure a sufficient amount to permit the hatch to open.

The system usually used for maintaining the seal inflated or deflated consists of a three port solenoid valve in combination with a source of pressure and a restrictor. The solenoid valve is positioned by a microswitch mechanically operated by the end of the latching pin or of a link in the latch operating mechanism, and serves to duct the air pressure to the inflatable seal or through an outlet vented to atmosphere thereby deflating the seal. The weight of these necessary components is considerable, and reliability is not always assured because of failure of the solenoid or microswitch.

While it may be merely inconvenient not to be able to build up pressure in the cabin or other area, it can be dangerous to be unable to release pressure where desired, as in the case of a forced evacuation by the pilot through the pilot compartment canopy while in flight. In such a condition it is absolutely necessary that the canopy be readily removable and, should the seal remain inflated, the pilot would be unable to leave the airplane.

This invention contemplates the provision of a mechanically controlled valve in the exhaust line of the inflatable seal which will be light in weight and yet be assured of a positive action by elimination of electrical mechanisms.

The usual valve which might be used in such an installation would consist of a plunger which is aided in contacting the valve seat by the fluid flow acting from the plunger side of the seat. This invention provides for the plunger acting against fluid flow to contact its seat. As a result when the mechanical control means is actuated to release air, the fluid pressure will force the valve open and allow the pressure contained in the seal to escape. The usual valve does not function in this manner, as it is necessary to force the valve open against the pressure of fluid acting thereon.

Other features and advantages of this invention will become apparent from the following description taken in connection with the accompanying drawings in which Figure 1 is a diagrammatic view of a typical inflatable seal system wherein pressure is regulated by the valve of this invention, the valve itself being in section to show the action of the plunger.

Figure 2 is sectional view of the valve showing the valve in closed position.

Figure 3 is a sectional view of the valve showing the effect of plunger overtravel.

Figure 4 is a sectional view of the valve showing the effect of increased pressure acting against the plunger.

The invention is shown embodied in an airplane having a fuselage wall 12 with a sliding hatch of the "canopy" type 13 and consists of a pressure seal 14 having a source of pressure 15 and an exhaust line 17 with a valve 18 interposed therein. The pressure of the air delivered to the seal 14 through inlet line 19 is regulated by a restrictor 20 interposed therein. The restrictor and the valve 18 are designed in relation to each other so that the capacity of the valve to allow air to exhaust through it is greater than the volume of air the restrictor allows to pass into the seal. By this arrangement, when the valve is open, air will exhaust from the seal 14 thereby deflating it whether or not the source of pressure 15 is operating.

Although the valve may be interposed in the exhaust line at any point, as shown herein the valve housing 22 is attached to the fuselage wall 12 by an integral end flange 23. The flange 23 is sealingly attached to the inner side of the fuselage wall so that the only communication between the interior of the valve and atmosphere is the vent 25 provided through the fuselage wall.

Central bore 29 of the valve housing 22 is open at its other end and is covered by a diaphragm 30 made of rubber or other suitable material having a central aperture 32 therethrough. An end plate 33 overlies the diaphragm and has a raised conical inner face radially inset from its periphery a distance sufficient to provide for a flat shoulder space around its periphery. End ring 34 has internal threads and an inwardly projecting flange and is threaded onto matching threads formed on the outside of housing 22, the flange of which ring bears on the shoulder of end plate 33 and serves to hold it and the diaphragm sealingly against the open end of housing 22 when the ring is tightly threaded thereon. The conical face of end plate 33 terminates in a fitting 36 which sealingly receives the exhaust line 17.

Disposed in the central bore 29 is a piston 35 having a flange 37 adjacent the face of the piston remote from the diaphragm 30. Flange 37 slides in the bore 29 and serves as the seat for a compression spring 38, the other end of which spring bears on the diaphragm 30 in the region where it is backed up by the shoulder of end plate 33. Spring 38 biases the piston away from the diaphragm 30. The other face of piston 35 faces the diaphragm, and is conically shaped, being shown as having the same contour as the raised conical projection of the end plate 33 although this is not essential to successful operation.

The apex of this conical face is adapted to project into the aperture 32 of the diaphragm 30 upon sufficient movement of the piston 35. Passing axially through the piston are a series of passageways 39 which are offset radially from the center line of the piston so that they break through the conical face of the piston intermediate the apex and the base of said conical face. These passageways serve to provide the only means of communication past the piston between the areas of the central bore divided by the piston.

The position of the piston in the bore may be controlled by any suitable means having sufficient strength to move the piston against the combined force of the fluid pressure and the spring 38. In the preferred form of the invention shown in Figure 1, it is controlled directly by the latch mechanism which retains the canopy 13 in locked position. Latch plate 24 carried by the wall 12 of the fuselage is provided with an opening 28 into which the stem 40 of piston 35 extends when the valve is in full open position.

Latch pin 41 is slidably carried in the end wall of hatch or canopy 13 and is adapted to contact the end of stem 40. The latch pin is actuated by lever 42, pivotally mounted on pivot pin 43, by means of the pin and slot connection 44, 45. The lever is provided with a spring loaded lock 46 selectively engageable with detents 47, 48 formed in quadrant 49 to hold the latch pin in unlocking and locking positions respectively.

It will be seen that when lever 42 is swung in a clockwise direction as viewed in Figure 1, it will move latch pin 41 to the left to cause it to enter opening 28 in the latch plate and lock the hatch in position. The pin 41 will engage the end of stem 40 and thus move piston 35 to the left to cause it to engage diaphragm 30 in the normal valve closing position as illustrated in Figure 2, which will effectively stop the flow of air therethrough.

When the latch pin 41 is withdrawn to the hatch unlocking position, the pressure of spring 38 and also the air pressure in line 17 will force piston 35 to the right, allowing the air to escape to the atmosphere and deflating seal 14.

Should the adjustment of the latch pin, when the canopy is being locked, linkage be such that the latch pin causes overtravel of the piston 35 it will occupy the position shown in Figure 3, or some intermediate position, and it will be seen that an effective seal is still maintained. Hence, it is not necessary to provide for adjustment of the length of stem 40. As the piston travels through the aperture of the diaphragm, the diaphragm will seal off the passageways 39 in addition to the conical face sealing the aperture. Thus, an effective seal is maintained despite overtravel of the piston, and in fact, a double seal is provided upon sufficient piston travel to cover the passageways.

Should the restrictor valve 20 fail to function properly or be set excessively high, pressure beyond normal will build up against the diaphragm causing it to assume the position shown in Figure 4. The lip of the aperture in the diaphragm is forced to stretch as it attempts to climb up the conical face of the piston producing a tighter contact. As the pressure increases, the surface of the diaphragm tends to roll against the conical face, providing more seal contact area, and additionally covering the passageways.

In order to move the piston into engagement with the diaphragm, both pressure of the spring 38 and pressure of the air passing through the aperture of the diaphragm must be overcome. Likewise, when the piston is engaged, the controlling mechanism must be capable of maintaining it in the engaged state. From this it can be seen that a great degree of safety is provided. When this valve is used on a seal around an installation of which the pilot's canopy is typical, a positive release is assured in an emergency. Should the pilot face an emergency he is assured of automatic release of seal pressure and reduction of seal friction as soon as the latch is disengaged, for the pressure of the spring and the air will return the piston and open the valve.

Although the now preferred embodiment of the invention has been shown and described herein, it is to be understood that the invention is not to be limited thereto, for the invention is susceptible to changes in form and detail within the scope of the appended claims.

I claim:

1. In a valve having a hollow casing with a reciprocatable piston disposed therein in fluid-tight contact therewith, a diaphragm having an aperture therethrough for admitting fluid under pressure into said casing, means for holding said diaphragm over one end of said casing in fluid-tight contact, means biasing said piston away from said diaphragm, a conical face on said piston projecting towards said diaphragm, passageways in said piston communicating with the other end of said hollow casing, said passageways being arranged around the apex of said conical face and spaced therefrom, means for moving said piston towards said diaphragm against said biasing pressure and against said fluid under pressure to first bring said apex into fluid-tight contact with the diaphragm so as to seal off said aperture to stop the flow of fluid therethrough, and to second bring said conical face into contact with the face of said diaphragm thereby covering said passageways to stop the flow of fluid therethrough as said piston travels in said hollow casing.

2. In a valve having a hollow casing with a reciprocatable piston disposed for axial travel therein, a diaphragm having an aperture therethrough for admitting fluid under pressure into said casing, means for holding said diaphragm over one end of said casing in fluid-tight contact, means biasing said piston away from said diaphragm, a conical face on said piston projecting towards said diaphragm, passageways in said piston, one end of said passageways being located on the conical face intermediate the apex and the peripheral base of said conical face, the other end of said passageways communicating with the other end of said hollow casing, means for moving said piston towards said diaphragm against said biasing pressure and against said fluid under pressure to first bring said apex into fluid-tight contact with the diaphragm so as to seal off said aperture to stop the flow of fluid therethrough, and to second bring said conical face into contact with the face of said diaphragm thereby covering said passageways to stop the flow of fluid therethrough as said piston travels in said hollow casing.

3. In a valve having a hollow casing with a reciprocatable piston disposed for axial travel therein, a diaphragm having an aperture therethrough for admitting fluid under pressure into said housing, means for holding said diaphragm over one end of said casing in fluid tight contact, spring means biasing said piston away from said diaphragm, a conical face on said piston projecting towards said diaphragm, passageways in said piston communicating with the other end of said hollow casing, means for moving said piston towards said diaphragm against said spring pressure and against said fluid under pressure to first bring the apex of said conical face in fluid-tight contact with the diaphragm so as to seal off said aperture of said diaphragm to stop the flow of fluid through said aperture, and to second bring said conical face of said piston into contact with the face of said diaphragm thereby covering said passageways to stop the flow therethrough as said piston travels in said hollow casing.

4. In a valve having a casing, a bore through said casing, a movable piston in said bore dividing said bore into first and second chambers, an inlet communicating with said first chamber, an outlet communicating with said second chamber, a diaphragm in said first chamber having a central aperture therethrough, a conical face on said piston projecting towards said inlet, and passageways through said piston, whereby as said piston moves toward said inlet it will first sealingly engage the diaphragm so as to seal off said aperture and second said diaphragm will sealingly cover said passageways.

5. In a valve having a casing, a bore through said casing, a piston disposed in said bore, a diaphragm covering one end of said bore and having an aperture therethrough, a conical face on said piston projecting towards said diaphragm, passageways through said piston, and means to move said piston in said bore so that first the apex of said conical face will sealingly engage the diaphragm so as to seal off said aperture and second said diaphragm will sealingly cover said passageways as said piston moves in said bore.

6. In a positive release system for releasing air pressure from a pressurized container having a source of pressure for supplying pressurized air to the container;

a release valve including a housing; a bore extending coaxially of the housing; a reciprocatable piston mounted in said bore; said piston having an enlarged portion at one end with a diameter substantially equal to that of said bore, and said piston being arcuate at the opposite end, said enlarged portion longitudinally dividing said bore into first and second chambers which are mutually segregated from communication with each other; an inlet in said first chamber; an outlet in said second chamber; a passage in said piston communicating said chambers with each other; a centrally apertured diaphragm disposed in said first chamber and extending transversely of said bore between the arcuate end of the piston and the inlet; biasing means for holding the piston away from the diaphragm; said piston having a predetermined normal stroke-length axially of said bore but being occasionally subjected to overtravel-producing axial forces with reference to said diaphragm; said arcuate end of the piston being shaped and arranged to contact the marginal peripheral portion, or lip, of the diaphragm that immediately surrounds the aperture, during both normal travel and overtravel of said piston; a seat for receiving said lip on occurrence of overtravel, said seat lying in said housing adjacent that face of the diaphragm that is distal from said arcuate end of said piston; said seat being shaped and arranged to receive said lip urged by overtravel of said arcuate end, thereby to maintain the arcuate end of the piston sealed throughout the entire range of mutual travel of the diaphragm and the piston.

References Cited in the file of this patent

UNITED STATES PATENTS

| | | |
|---|---|---|
| 518,171 | Ashley | Apr. 10, 1894 |
| 1,919,696 | George | July 25, 1933 |
| 2,328,805 | Holthouse | Sept. 7, 1943 |
| 2,638,292 | Horne et al. | May 12, 1953 |
| 2,645,449 | Gulick | July 14, 1953 |
| 2,684,081 | Chase | July 20, 1954 |

FOREIGN PATENTS

| | | |
|---|---|---|
| 8,756 | Great Britain | of 1887 |
| 520,433 | Great Britain | of 1940 |